United States Patent
Zhong et al.

(10) Patent No.: US 9,274,378 B2
(45) Date of Patent: Mar. 1, 2016

(54) ALIGNMENT FILM, A METHOD OF FABRICATING THE SAME, AND A LIQUID CRYSTAL DISPLAY USING THE SAME

(71) Applicant: Shenzhen China Star Optoelectronics Technology Co., Ltd., Shenzhen, Guangdong (CN)

(72) Inventors: Xinhui Zhong, Shenzhen (CN); Kuan-cheng Lee, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 194 days.

(21) Appl. No.: 14/001,640

(22) PCT Filed: Jun. 28, 2013

(86) PCT No.: PCT/CN2013/078416
§ 371 (c)(1),
(2) Date: Aug. 26, 2013

(87) PCT Pub. No.: WO2014/205800
PCT Pub. Date: Dec. 31, 2014

(65) Prior Publication Data
US 2014/0375939 A1    Dec. 25, 2014

(30) Foreign Application Priority Data

Jun. 25, 2013    (CN) .......................... 2013 1 0256750

(51) Int. Cl.
*G02F 1/1337*    (2006.01)
*C09K 19/56*    (2006.01)
*C09D 179/08*    (2006.01)
*C08G 73/10*    (2006.01)

(52) U.S. Cl.
CPC ...... *G02F 1/133723* (2013.01); *C08G 73/1042* (2013.01); *C08G 73/1053* (2013.01); *C08G73/1067* (2013.01); *C08G 73/1071* (2013.01); *C09D 179/08* (2013.01); *C09K 19/56* (2013.01); *Y10T 428/1023* (2015.01)

(58) Field of Classification Search
CPC ........... C08G 73/1042; C08G 73/1053; C08G 73/1067; C08G 73/1071; C09D 179/08; C09K 19/56; Y10T 428/1023; G02F 1/133723; B32B 2457/202
USPC ............................................. 428/1.25–1.26
See application file for complete search history.

(56) References Cited

U.S. PATENT DOCUMENTS

| | | | | |
|---|---|---|---|---|
| 3,554,790 | A | * | 1/1971 | Gehman .................... 428/484.1 |
| 2004/0048004 | A1 | * | 3/2004 | Hosaka ................. C07C 217/86 428/1.26 |
| 2004/0054096 | A1 | * | 3/2004 | Hosaka ................. C07C 217/86 525/420 |
| 2009/0208673 | A1 | * | 8/2009 | Seki et al. ....................... 428/1.1 |
| 2009/0292103 | A1 | * | 11/2009 | Suzuki et al. ................. 528/322 |
| 2011/0199566 | A1 | * | 8/2011 | Mazusaki et al. ............. 349/123 |
| 2011/0267574 | A1 | * | 11/2011 | Kawahira et al. ............. 349/158 |

FOREIGN PATENT DOCUMENTS

| | | | | |
|---|---|---|---|---|
| CN | 101824327 | A | | 9/2010 |
| CN | 101824327 | A | | 1/2013 |
| JP | 2010197999 | A | * | 9/2010 |
| WO | WO 2010047011 | A1 | * | 4/2010 ................ C08F 2/44 |
| WO | WO 2010079703 | A1 | * | 7/2010 ............ G02F 1/1337 |

* cited by examiner

Primary Examiner — Sophie Hon
(74) Attorney, Agent, or Firm — Andrew C. Cheng

(57) ABSTRACT

The present invention relates a technique of liquid crystal display, especially to an alignment film applied to a substrate of a liquid crystal display. The alignment film includes a plurality of alignment molecules formed by polymerizing monomers having at least a photosensitive group, and has formula e as

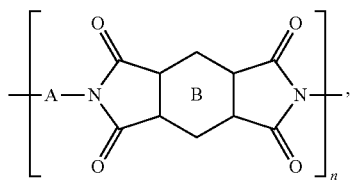

wherein the component A and/or the component B in formula e comprise(s) terphenyl. The present invention further provides a method of fabricating the alignment film and a liquid crystal display using the same. Due to the photosensitive group of the monomers, the plurality of alignment molecules can be formed with an appropriated rate, and the alignment film formed thereby has homogeneity. Therefore, the optic quality and overall performance of the liquid crystal display are enhanced.

18 Claims, 2 Drawing Sheets

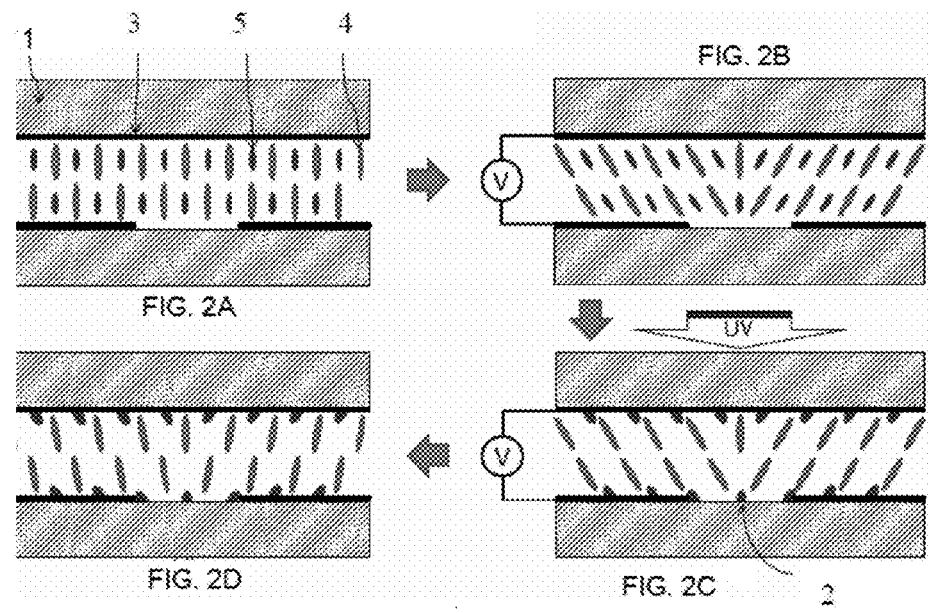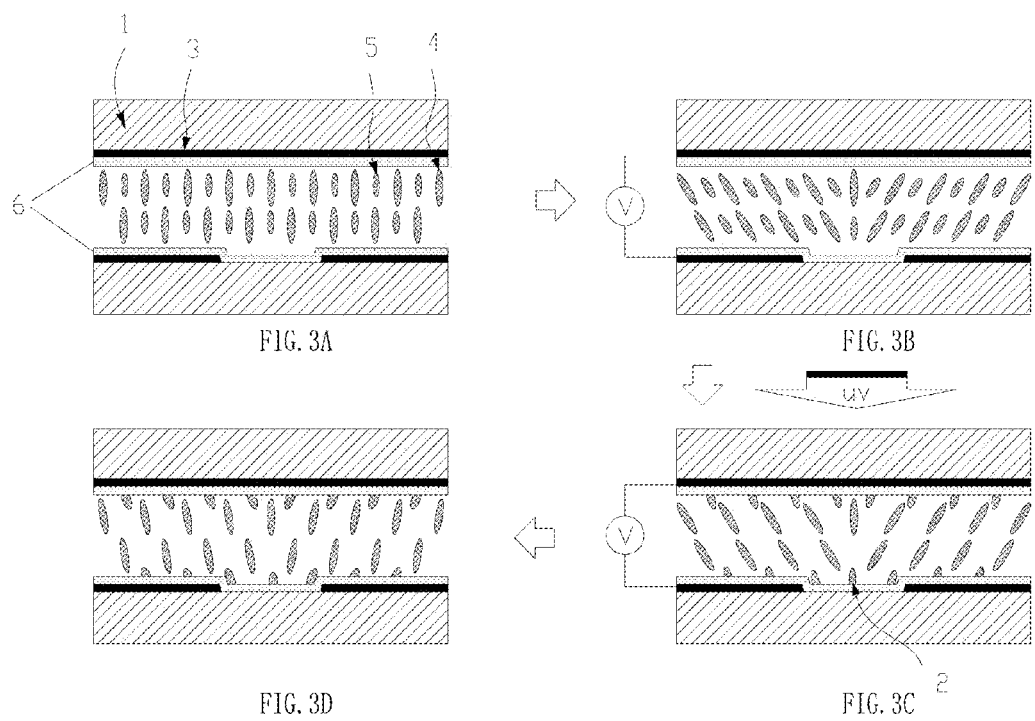

ALIGNMENT FILM, A METHOD OF FABRICATING THE SAME, AND A LIQUID CRYSTAL DISPLAY USING THE SAME

FIELD OF THE INVENTION

The present invention relates to a technique of liquid crystal display, and more particularly to a new technique of an alignment film, liquid crystal display using the same, and a method of fabricating the same.

BACKGROUND OF THE INVENTION

With the progress of communicating technique, electronic products such as cell phones, computers and even house electric equipment are getting to have intelligent, portable and mobile functionalities, so that efficiency of exchanging information between users and such electronic products become a critical point of the progress of communicating technique. For an aspect of clearly and efficiently delivering information to users of such electronic products, a display of such electronic products is designed to meet multiple demands such as high efficiency, upgraded quality, large memory capacity, lower weight, lower cost and lower power consumption. Consequentially, the conventional CRT display was replaced by the liquid crystal display (LCD) in just a few years.

In early stage, the LCD is the twisted nematic (TN) or the super twisted nematic (STN) type, and liquid crystal molecules with a chiral agent disposed in the TN/STN type LCD is a positive (nematic) type. A long axis of the positive type liquid crystal molecules is parallel to a surface of each substrate of the TN/STN type LCD when no electricity is applied thereto. An orientation of the positive type liquid crystal molecules is determined by a rubbing direction (i.e. alignment direction) formed on an alignment layer which is usually made of polyimide and disposed on the surface of each substrate of the TN/STN type LCD. The alignment directions of the alignment layers respectively disposed on the two substrates of the TN/STN type LCD are perpendicular to each other, whereby the positive type liquid crystal molecules exhibit a continuously twisted arrangement from one substrate to the other substrate, wherein a twisted angle of the positive type liquid crystal molecules in the TN type LCD is about 90 degree, and a twisted angle thereof in the STN type LCD is about 270 degree. Besides the two substrates and the positive type liquid crystal molecules disposed therein, the TN/STN type LCD includes two polarizer layers and a backlight, wherein the two polarizer layers are respectively adhered to outer surfaces of the two substrates and perpendicular to a light-absorbing axis of each substrate. Light emitted from the backlight is polarized by one polarizer layer disposed between the substrate and the back light, then a polarized direction of the polarized light is transformed by the positive type liquid crystal molecules arranged at the twisted angle, and then the polarized light passes through the other polarizer layer, so as the TN/STN type LCD is on transmitting state (also called "white state"). When a voltage is applied to the TN/STN type LCD, the long axis of the positive type liquid crystal molecule tends to align according to the direction of electric field, and the polarized light is passed through the untwisted liquid crystal molecules then reflected by the other polarizer layer, so as the TN/STN type LCD is on reflecting state (also called "black state"). Drawbacks of the TN/STN type LCD are small viewable angle, severe brightness difference and color difference at large view angles. Therefore, a compensation film must be applied thereto for correcting such drawbacks and it causes to increase the manufacture cost of the TN/STN type LCD.

A thin-film transistor liquid crystal display (TFT-LCD) of Multi-domain vertical alignment (MVA) type provides an excellent solution to the view angle limitation that the TN/STN type LCD is subjected to, and it uses negative (nematic) type liquid crystal molecules and vertical type alignment films. When no voltage is applied to the MVA type TFT-LCD, the long axis of the negative type liquid crystal molecules is perpendicular to the surface of the substrate. A voltage applied to the MVA type TFT-LCD would cause the negative type liquid crystal molecules to tilt, and the long axis of the negative type liquid crystal molecule is allowed to align in a direction perpendicular to the electric field. To overcome the view angle limitation, a pixel of the MVA type TFT-LCD is divided into multiple domains and the negative type liquid crystal molecules disposed therein are caused to tilt in different directions so that the MVA type TFT-LCD can provide similar viewing effect at various directions.

Several ways can be adopted to allow liquid crystal molecules, disposed in different domains of a pixel, orienting in different direction respectively. As shown in FIG. 1A, the first way is to form bumps 2 on upper and lower substrate 1 having ITO electrodes 3 formed thereon by means of exposing development, so that the bumps 2 can cause a pre-tilt angle for liquid crystal molecules around the bumps, and thus guide the other liquid crystal molecules to tilt to predetermined directions.

As shown in FIG. 1B, the second way is to form ITO pixel electrodes 3 that are of predetermined patterns on upper and lower substrates respectively, so that an electric field induces a predetermined tilt angle, thereby controlling the orientation of the liquid crystal molecules in different domains. The second way is often called patterned vertical alignment (PVA).

As shown in FIG. 2A to 2D, the third way, so-called polymer stabilized vertical alignment (PSVA), is to form a patterned ITO electrode 3, usually formed as a fishbone type, on one substrate 1, and to form a full-layer ITO electrode 3 over the other substrate 1, and a plurality of photo-polymerizable monomers 5 are added in the liquid crystal medium. An electric field is firstly applied to cause tilting liquid crystal molecules in the liquid crystal medium, and then radiation of ultraviolet ray is applied to cause a polymerization of the plurality of the photo-polymerizable monomers to form bumps 2 deposited on the surface of the substrate 1, and the bumps 2 can guide a tilting angle of the liquid crystal molecules. In comparison to the other MVA techniques, the PSVA technique has a lot of advantages such as higher transmission, higher contrast and faster response, so that the PSVA technique becomes a mainstream technique of fabricating large-size TFT-LCDs. However, a key point in the PSVA technique is to control a polymerization reaction of the plurality of photo-polymerizable monomers 5, wherein to control the polymerization reaction includes a photo-reaction rate, homogeneity of the bumps 2, and unreacted residue of the plurality of photo-polymerizable monomers 5.

Therefore, there is a need of providing an improved PSVA technique of fabricating a LCD having enhanced performance.

SUMMARY OF THE INVENTION

In accordance with an aspect for increasing optimal control of a polymerization reaction of a plurality of photo-polymerizable monomers, the present invention provides an alignment film applied to a substrate of a LCD, and the alignment film can enhance utilization of light energy, so as to effectively induce and control the polymerization reaction thereof. The alignment film includes a plurality of alignment molecules. The plurality of alignment molecules is formed by polymerizing monomers of at least an anhydride and a diamine, and has formula e as

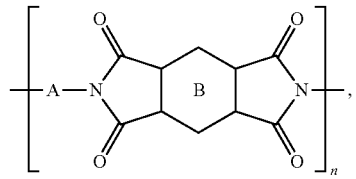

wherein the component A and/or the component B in formula e comprise(s) terphenyl.

In a preferred embodiment, the component A and/or the component B further include(s) an alkyl, alkoxy or ester group of carbon atoms less than or equal to twelve; or one or more than one heteroatom selected from N, O, F, Si, P, S, Cl, Br or I.

In a preferred embodiment, a mass ratio of the component A and/or the component B to the monomer of the plurality of alignment molecules is in 5~50%.

In a preferred embodiment, a molecular weight of each alignment molecule is in $5\times10^3 \sim 5\times10^5$ g/mole.

In accordance with another aspect, the present invention provides a method of fabricating an alignment film including steps as follows. Firstly, the plurality of alignment molecules according to the present invention is provided. Then, the plurality of alignment molecules is dissolved with a solvent to form an alignment molecule solution, wherein a mass ratio of the solvent to the alignment molecule solution is in 80~99%. Then, the alignment molecule solution is coated on a substrate. Then, the alignment molecule solution coated on the substrate is prebaked under a temperature in 100~200° C. for 20 to 60 minutes, and then baked under a temperature in 180~250° C. for 30 to 150 minutes to form an alignment film.

In a preferred embodiment, the solvent includes one or more than one composition of N-methylpyrrolidone (NMP), N-ethyl pyrrolidone (NEP), γ-butyrolactone (γ-BL), N,N-dimethylformamide (DMF), N,N-dimethylacetamide (NMAc), dimethyl sulfoxide (DMSO), m-cresol or chloroform.

In a preferred embodiment, the alignment molecule solution further includes a leveling agent, a mass ratio of the leveling agent to the alignment molecule solution is in 0.01~2%, and the leveling agent is selected from isophorone, diacetone alcohol, aromatic hydrocarbon mixture or dibasic ester mixture.

In accordance with another aspect, the present invention provides a liquid crystal display. The liquid crystal display includes two substrates, a liquid crystal medium and two alignment films. The two substrates are oppositely arranged and parallel to each other. The liquid crystal medium has a plurality of photo-polymerizable monomers, and is disposed between the two substrates. Each alignment film is formed on a surface of each substrate neighboring the liquid crystal medium, wherein each alignment film includes the plurality of alignment molecules according to the present invention.

In a preferred embodiment, the plurality of photo-polymerizable monomers has one or more than one compound represented by following:

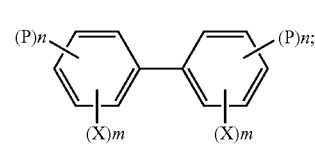

formula 1

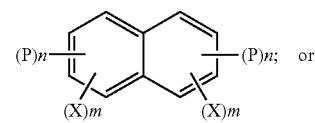

formula 2

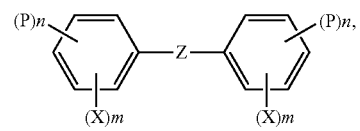

formula 3 wherein the functional group P represents a polymerizable group including one or more than one group selected from methacrylate, acrylate, vinyl, ethylene or epoxy; the integer n of 1, 2 or 3 represents a number of the functional group(s) P bonding to an aromatic ring; the substituent X includes —F, —Cl, —Br, —CH3, —CN or an alkyl, alkyl ether or alkyl thiol ether group consisted of 2~8 carbon atoms; the integer m of 1, 2 or 3 represents a number of the substituent(s) X bonding to the aromatic ring; and the functional group Z represents one or more than one group selected from —O—, —COO—, —OCO—, —CH2O—, —OCH2—, —O(CH2)2O—, —COCH2-, —CH2- or —C≡C—.

In a preferred embodiment, a hydrogen atom (H) in the functional group Z is substituted by —F, —Cl, —Br, —CH3 or —CN.

In a preferred embodiment, the liquid crystal display further includes two electrodes respectively disposed between each alignment film and each substrate.

In a preferred embodiment, a mass ratio of the plurality of photo-polymerizable monomers to the liquid crystal medium is in 0.25~5%.

In accordance with the present invention, the alignment film includes the photo-sensitive group such as terphenyl that can enhance absorption of light energy, and effectively induce and control the polymerization reaction of the plurality photo-polymerizable monomers. Therefore, a mura drawback in a liquid crystal display using the alignment film can be obviated, and a optic performance of the liquid crystal display can be highly enhanced.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 2A~2D are schematic cross-sectional views illustrating a partial process flow of a method of PSVA technique according to prior art; and FIG. 3A~3D are schematic cross-sectional views illustrating a partial process flow of a method of PSVA technique according to the present invention.

DETAILED DESCRIPTION OF PREFERRED EMBODIMENTS

Figure 1A:
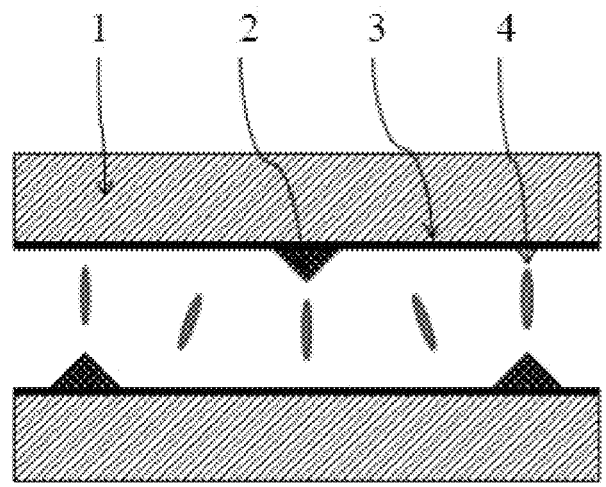
FIG. 1A~1B are schematic cross-sectional views illustrating a partial process flow of a method of exposure development and PVA technique according to prior art.
Figure 1B:
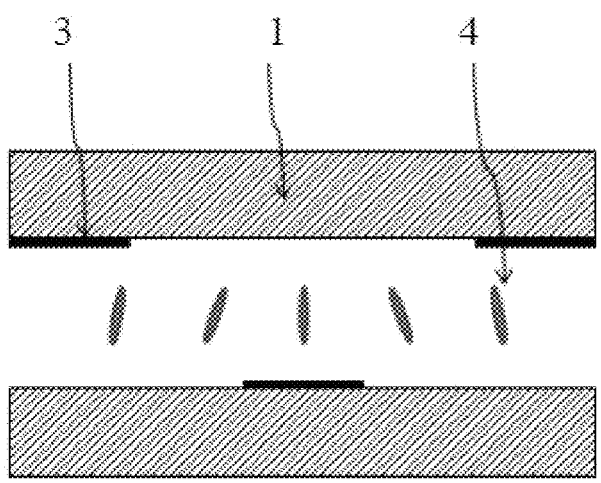

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

According to the present invention, an alignment film and a liquid crystal display using the same include a plurality of alignment molecules having photo-sensitive groups, wherein the plurality of alignment molecules can enhance utilization of light energy from a certain wavelength ultraviolet, and control a polymerization rate of a plurality of photo-polymerizable monomers, so that homogeneity of bumps formed by polymerizing the plurality of photo-polymerizable monomers can be obtained.

Embodiment 1

The plurality of alignment molecules is formed by polymerizing monomers of at least compound having formula e as

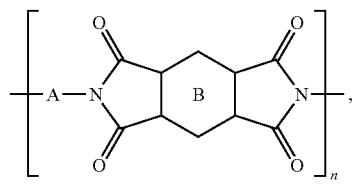

wherein the component A and/or the component B in formula e comprise(s) terphenyl. Generally, the plurality of alignment molecules is a polyimide PI-1 formed by polymerizing diamine monomers and dianhydride monomers through dehydration-polymerization reaction. In this embodiment, the polyimide PI-1 is formed by polymerizing monomers of one dianhydride having formula a1 and monomers of two diamines having formulas t1 and b1 as following:

formula a1
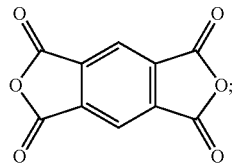

formula t1
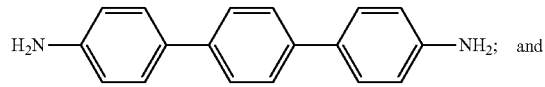
and formula b1
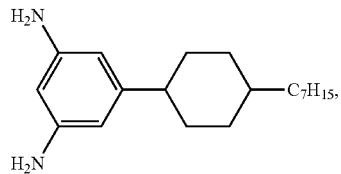

wherein a mass ratio of the monomers having formula a1, t1 and b1 is 5:2:3. In this embodiment, the diamine monomers having formula t1 includes terphenyl, therefore, people ordinarily skilled in the art shall know that the polyimide PI-1 formed therewith must include terphenyl. A molecular weight of the polyimide PI-1 is greater than 5000.

Then, the present invention provides a method of fabricating an alignment film with the plurality of alignment molecules including steps as follows:

I. dissolving the plurality of alignment molecules (i.e. the polyimide PI-1) with a solvent to form an alignment molecule solution, wherein the solvent is N-methylpyrrolidone (NMP), and a mass ratio of the solvent to the alignment molecule solution is 94%;

II. coating the alignment molecule solution on a substrate; and

III. prebaking the alignment molecule solution coated on the substrate under 200° C. for 20 minutes, and then baking the alignment molecule solution coated on the substrate under 180° C. for 30 minutes to form the alignment film by dehydration polymerization of the alignment molecules.

Then, the present invention provides a liquid crystal display using the alignment film. As shown in FIG. 3A, the liquid crystal display includes two substrates 1, a liquid crystal medium and two alignment films. The two substrates 1 are oppositely arranged and parallel to each other. The liquid crystal medium has a plurality of liquid crystal molecules 4 and a plurality of photo-polymerizable monomers 5, and it is disposed between the two substrates 1. An electrode 3 of plane type is disposed above a surface of one substrate neighboring the liquid crystal medium, and an electrode 3 of fishbone type is disposed above the other substrate 1. The plurality of liquid crystal molecules 4 is lined up in a direction when the two electrodes 3 are coupled to a power supply. Two alignment films 6 are respectively formed on the two electrodes 3. The two alignment films 6 provide an appropriate preset angle, so that a response time of the plurality of liquid crystal molecules can be shrunken. The plurality of photo-polymerizable monomers 5 has formula 1 as

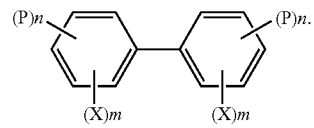

In this embodiment, a sub-formula of the plurality of photo-polymerizable monomers 5 is represented by formula r1 as

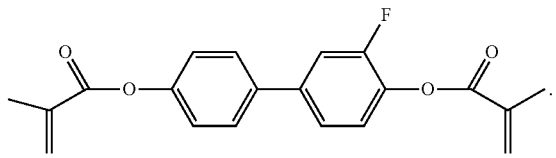 [SMILES: C=C(C)C(=O)Oc1ccc(-c2ccc(OC(=O)C(=C)C)c(F)c2)cc1]

An aligning mechanism between the plurality of alignment molecules and the plurality of photo-polymerizable monomers in the liquid crystal medium includes steps as follows. Firstly, please refer to FIG. 3A again, the two alignment films 6 according to the present invention are applied to a liquid crystal display fabricated by the polymer stabilized vertical alignment (PSVA) technique, the plurality of photo-polymerizable monomers 5 having formula r1 is added in the liquid crystal medium, and a mass ratio of the plurality of photo-polymerizable monomers to the liquid crystal medium is 0.5%. Then, as shown in FIG. 3B, the plurality of liquid crystal molecules 4 disposed in several domains is tilted at a preset angle through the electric field. Then, as shown in FIG. 3C~3D, the photo-sensitive groups, i.e. terphenyl, of the plurality of alignment molecules in the two alignment films 6 can strongly absorb light energy from ultraviolet in wavelength 260 nm to 380 nm, and deliver the light energy to cause a polymerization of the plurality of photo-polymerizable monomers 5. Therefore, a plurality of polymers which is formed by the plurality of photo-polymerizable monomers 5 dispersing in the liquid crystal medium is rearranged in the liquid crystal medium. The plurality of polymers 2 (i.e. "bumps" 2) is used for causing an orientation of the plurality of liquid crystal molecules 4. On the other hand, terphenyl as a portion of a branched or main chain in the plurality of alignment molecules are evenly distributed in the alignment film 6, so as to allow the bumps 2 formed with homogeneity, and unreacted residue of the plurality of photo-polymerizable monomers 5. Therefore, the alignment film according to the present invention can meet demands of fabricating the liquid crystal display. Moreover, due to the alignment films 6 having terphenyl evenly distributed therein, the bumps 2 can be uniformly formed above the alignment films 6, and then they provide an appropriate preset angle for the plurality of liquid crystal molecules 4 tilting in the liquid crystal medium. It is noted that a photo-polymerization time of conventional photo-polymerizable monomers needs more than two hours to meet a standard of residue-monomers amount being lower than 20 ppm. In comparison the present invention to conventional photo-polymerizable monomers, the alignment films 6 can effectively shorten a polymerization time of the plurality of photo-polymerizable monomers 5, so that the polymerization time thereof needs only 90 minutes to meet the same standard (i.e. residue-monomers amount being lower than 20 ppm) under the same the polymerization conditions of polymerizing conventional photo-polymerizable monomers. Generally, The faster polymerization of the plurality of photo-polymerizable monomers is performed, the better optic quality of the liquid crystal display is obtained.

Embodiment 2

In this embodiment, the plurality of alignment molecules is a polyimide PI-2 formed by polymerizing monomers of the dianhydride having formula a1 and monomers of two diamines having formula b1 and formula t2 as following:

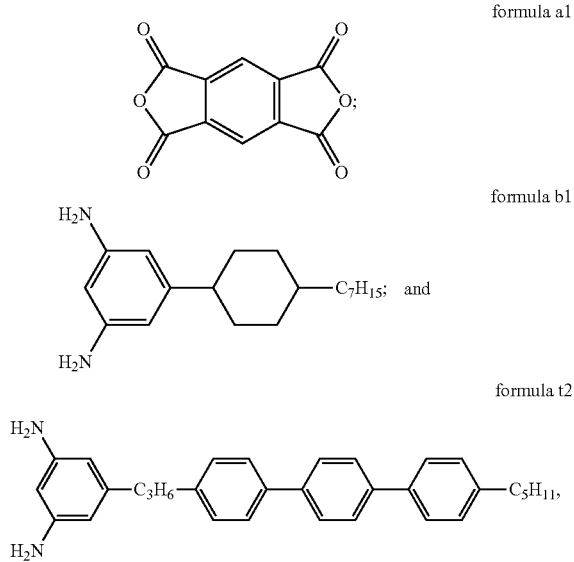

wherein a mass ratio of the monomers having formula a1, t1 and b1 is 5:1:4. In this embodiment, a molecular weight of the polyimide PI-2 is in $5000{\sim}5{\times}10^5$ g/mole. Accordingly, the diamine monomers having formula t2 includes terphenyl, therefore, the polyimide PI-2 formed therewith must include terphenyl. An alignment film according to this embodiment is fabricated by following steps. Firstly, the plurality of alignment molecules (i.e. the polyimide PI-2) is dissolved with a solvent and a leveling agent of isophorone to form an alignment molecule solution, wherein the solvent is a mixture of N-methylpyrrolidone (NMP) and γ-butyrolactone (γ-BL), wherein a mass ratio of the NMP to the alignment molecule solution is 95%, a mass ratio of the γ-BL to the alignment molecule solution is 1%, a mass ratio of the isophorone to the alignment molecule solution is 0.01%, and a remaining mass ratio is the polyimide PI-2 to the alignment molecule solution. Then, the alignment molecule solution is coated on a substrate. Then, the alignment molecule solution coated on the substrate is prebaked under 200° C. for 60 minutes, and then baked under 250° C. for 150 minutes to form the alignment film. The alignment film cooperates with a plurality of photo-polymerizable monomers having formula 2 as

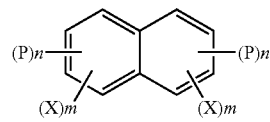

to provide an aligning mechanism to the plurality of liquid crystal molecules in the liquid crystal medium. In this embodiment, a sub-formula of the plurality of photo-polymerizable monomers is represented by formula r2 as

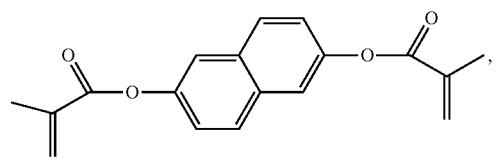 [SMILES: C=C(C)C(=O)Oc1ccc2cc(OC(=O)C(=C)C)ccc2c1]

wherein a mass ratio of the plurality of photo-polymerizable monomers having formula r2 to the liquid crystal medium is 0.4%. A photo-polymerization time of the plurality of photo-polymerizable monomers having formula r2 needs only 60 minutes to meet the same standard (i.e. residue-monomers amount being lower than 20 ppm) under the same polymerization conditions of conventional photo-polymerizable monomers, and the mura drawback in the liquid crystal display can be obviated. The alignment mechanism in this embodiment is as the description in embodiment 1, and it is not redundantly described herein.

Embodiment 3

In this embodiment, the plurality of alignment molecules is a polyimide PI-3 formed by polymerizing monomers of a dianhydride having following formula a2 and monomers of two diamines having formula t2 and formula b2 as following:

formula a2

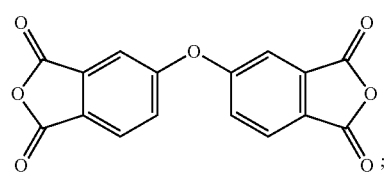

formula t2

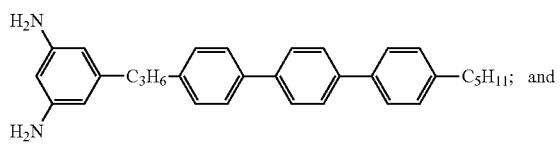; and formula b2

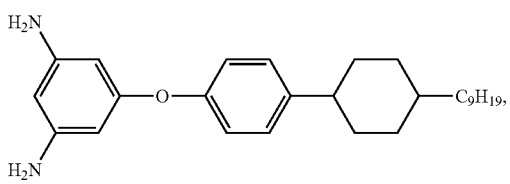

wherein a mass ratio of the monomers having formula a2, t2 and b2 is 5:1.5:3.5, and a mass ratio of terphenyl to the dianhydride and diamine monomers is 15%. In this embodiment, a molecular weight of the polyimide PI-3 is in 5000~1× $10^5$ g/mole. Accordingly, the diamine monomers having formula t2 includes terphenyl, therefore, the polyimide PI-3 formed therewith must include terphenyl. An alignment film according to this embodiment is fabricated by following steps. Firstly, the plurality of alignment molecules (i.e. the polyimide PI-3) is dissolved with a solvent and a leveling agent of diacetone alcohol to form an alignment molecule solution, wherein the solvent is a mixture of N-methylpyrrolidone (NMP) and N-ethyl pyrrolidone (NEP), wherein a mass ratio of the NMP to the alignment molecule solution is 85%, a mass ratio of the NEP to the alignment molecule solution is 10%, a mass ratio of the isophorone to the alignment molecule solution is 0.2%, and a remaining mass ratio is the polyimide PI-3 to the alignment molecule solution. Then, the alignment molecule solution is coated on a substrate. Then, the alignment molecule solution coated on the substrate is prebaked under 160° C. for 40 minutes, and then baked under 240° C. for 100 minutes to form the alignment film. The alignment film cooperates with a plurality of photo-polymerizable monomers having formula 3 as

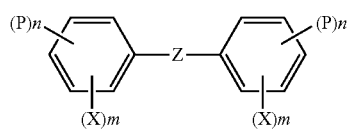

to provide an aligning mechanism to the plurality of liquid crystal molecules in the liquid crystal medium. In this embodiment, a sub-formula of the plurality of photo-polymerizable monomers is represented by formula r3 as

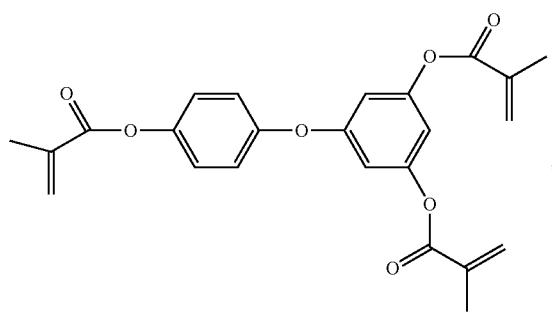

wherein a mass ratio of the plurality of photo-polymerizable monomers having formula r2 to the liquid crystal medium is 0.3%. The alignment mechanism in this embodiment is as the description in embodiment 1, and it is not redundantly described herein. A photo-polymerization time of the plurality of photo-polymerizable monomers having formula r3 needs only 40 minutes to meet the same standard (i.e. residue-monomers amount being lower than 20 ppm) under the same polymerization conditions of conventional photo-polymerizable monomers, and the mura drawback in the liquid crystal display can be obviated.

In some embodiments according to the present invention, dianhydride monomers for use to form the plurality of alignment molecules includes but not limited to formulas as following:

formula a3

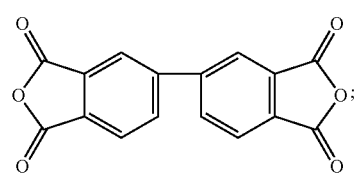

formula a4

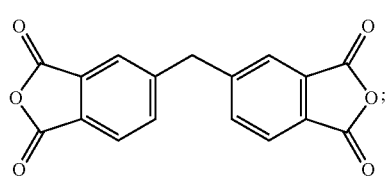

formula a5

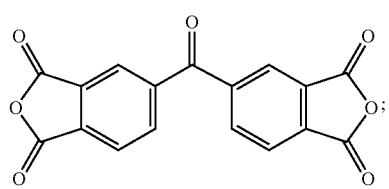

formula a6

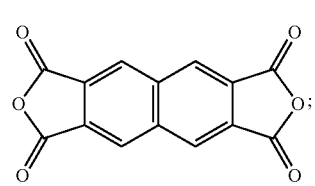

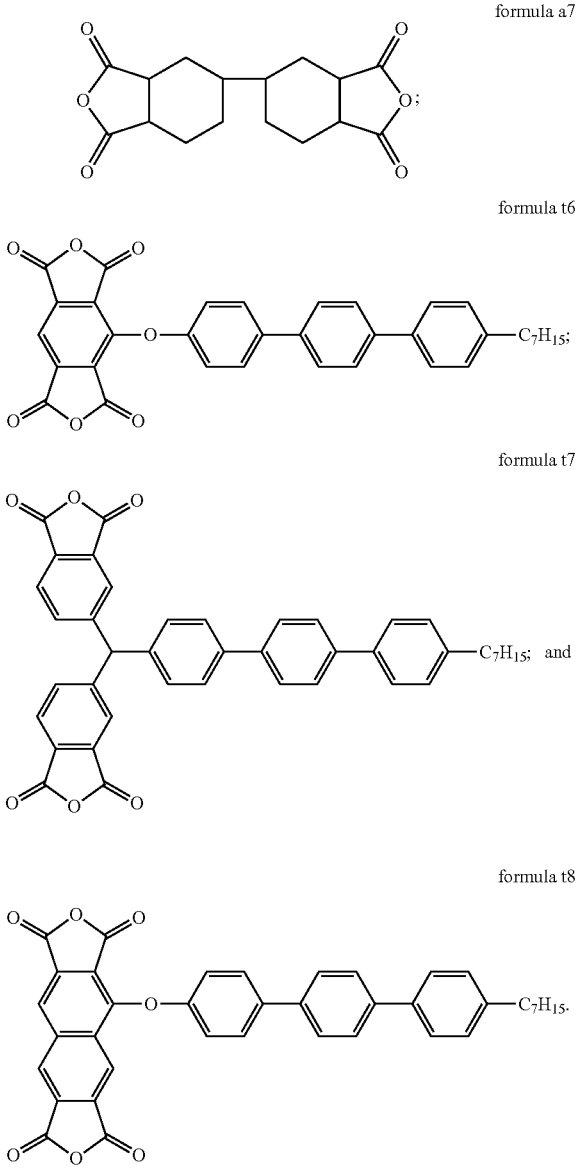

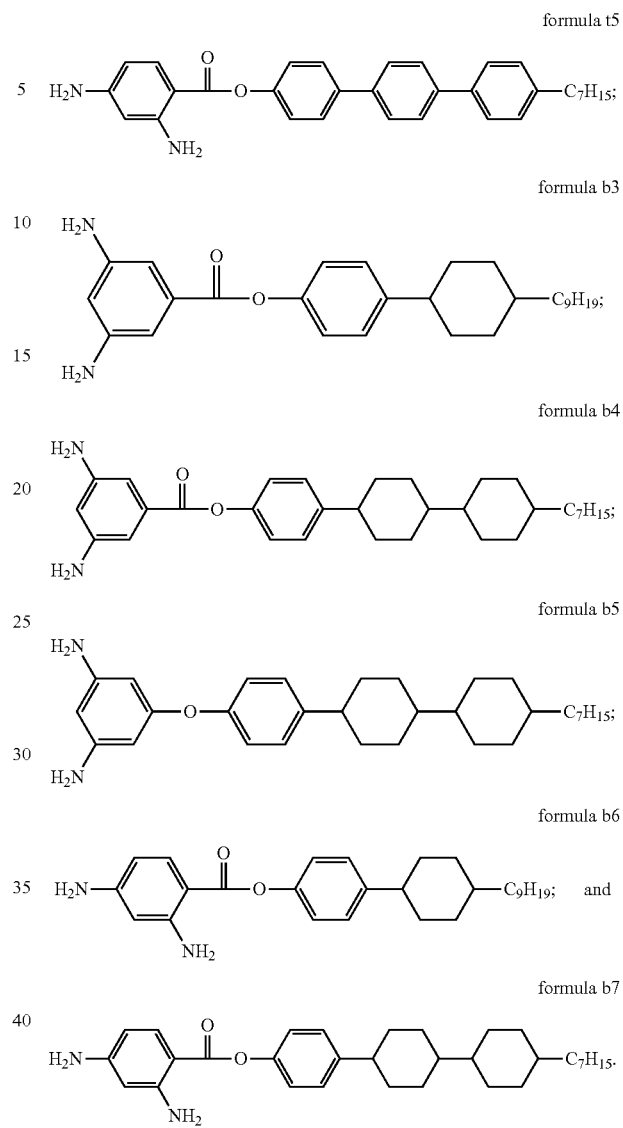

In some embodiments according to the present invention, diamine monomers for use to form the plurality of alignment molecules includes but not limited to formulas as following:

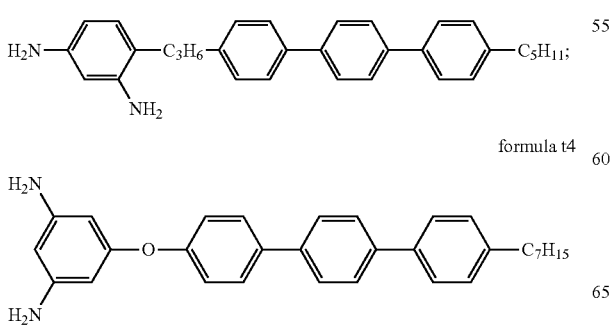

The dianhydride and the diamine monomers having above formulas can be consisted of an arbitrary combination without prejudice to the case law of the polymerization reaction, wherein a molar ratio of the dianhydride monomers is equal to a molar ratio of the diamine monomers in the arbitrary combination, and a mass ratio of the monomers, which are selected from one of formula t1~t5 including terphenyl, to the arbitrary combination of the dianhydride and the diamine monomers is in 5~50%.

In benzene ring structure of the plurality of photo-polymerizable monomers based on formula 1, 2 or 3 can be substituted. In the following formulas:

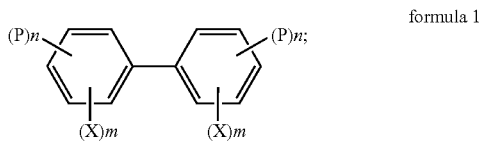

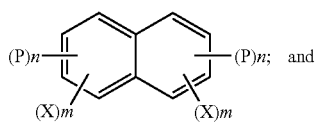

formula 2

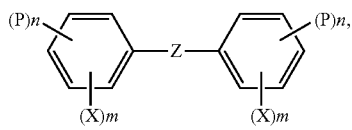

formula 3 the functional group P represents a polymerizable group comprising one or more than one group selected from methacrylate, acrylate, vinyl, ethylene or epoxy; the integer n of 1, 2 or 3 represents a number of the functional group(s) P bonding to an aromatic ring;

the substituent X comprises —F, —Cl, —Br, —CH3, —CN or an alkyl, alkyl ether or alkyl thiol ether group consisted of 2~8 carbon atoms; the integer m of 1, 2 or 3 represents a number of the substituent(s) X bonding to the aromatic ring; and the functional group Z represents one or more than one group selected from —O—, —COO—, —OCO—, —CH2O—, —OCH2O—, —O(CH2)2O—, —COCH2-, —CH2- or —C≡C—. In general, a mass ratio of the plurality of photo-polymerizable monomers to the liquid crystal medium is in 0.25~5%, moreover, a preferred mass ratio thereof is in 0.3~5%.

According to the present invention, the solvent for use to dissolve the plurality of alignment molecules can be selected from but not limited to one or more than one composition of N-methylpyrrolidone, N-ethyl pyrrolidone, γ-butyrolactone, N,N-dimethylformamide, N,N-dimethylacetamide, dimethyl sulfoxide, m-cresol or chloroform.

According to the present invention, the leveling agent for use to be added in the alignment molecule solution can be selected from a product well known in the art such as Solvesso 150 (aromatic hydrocarbon mixture), DBE (dibasic ester mixture).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A structure comprising a liquid crystal medium, and an alignment film for use in a substrate of a liquid crystal display, the alignment film comprising:
    a plurality of alignment molecules, formed by polymerizing monomers of at least an anhydride, a first diamine having terphenyl and a second diamine not having terphenyl, wherein the first diamine is selected from one of diamines having terphenyl represented by

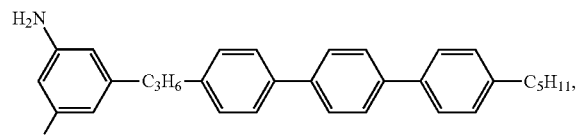

formula t2

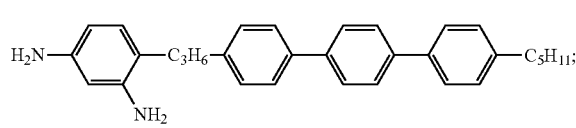

formula t3

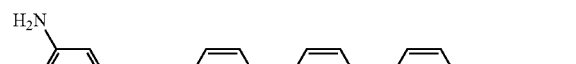

formula t4

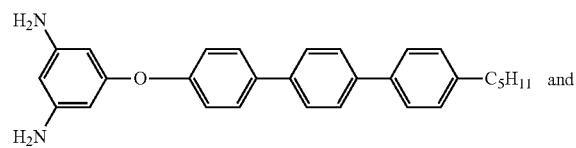

formula t5

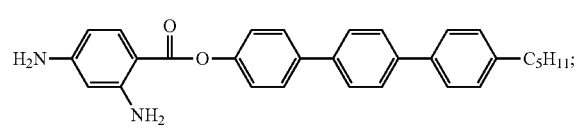

a mass amount of the first diamine is less than a mass amount of the second diamine; and the plurality of alignment molecules has formula e as

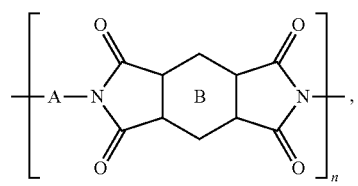

wherein the component A and the component B in formula e comprise terphenyl.

2. The structure according to claim 1, wherein the component A and/or the component B further comprise(s) an alkyl, alkoxy or ester group of carbon atoms less than or equal to twelve; or one or more than one heteroatom selected from N, O, F, Si, P, S, Cl, Br or I.

3. The structure according to claim 1, wherein a mass ratio of the component A or the component B to the monomer of the plurality of alignment molecules is in 5~50%.

4. The structure according to claim 1, wherein a molecular weight of each alignment molecule is in $5 \times 10^3 \sim 5 \times 10^5$ g/mole.

5. A method of fabricating a structure comprising a liquid crystal medium and an alignment film for use in aligning the liquid crystal medium, comprising steps as follows:

polymerizing monomers of at least an anhydride, a first diamine having terphenyl and a second diamine not having terphenyl to form a plurality of alignment molecules, wherein the first diamine is selected from one of diamines having terphenyl represented by

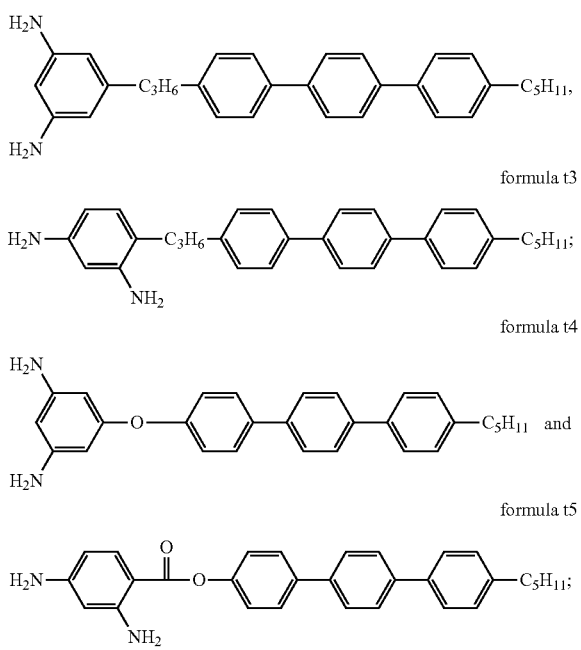

a mass amount of the first diamine is less than a mass amount of the second diamine; and the plurality of alignment molecules has formula e as

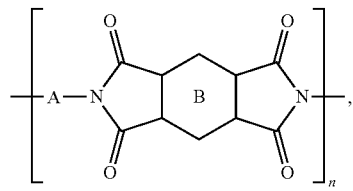

wherein the component A and the component B in formula e comprise terphenyl;

dissolving the plurality of alignment molecules with a solvent to form an alignment molecule solution, wherein a mass ratio of the solvent to the alignment molecule solution is in 80~99%;

coating the alignment molecule solution on a substrate; and prebaking the alignment molecule solution coated on the substrate under a temperature in 100~200° C. for 20 to 60 minutes, and then baking the alignment molecule solution coated on the substrate under a temperature in 180~250° C. for 30 to 150 minutes to form the alignment film in the forming of the structure.

6. The method of fabricating the structure according to claim 5, wherein the component A and/or the component B further comprise(s) an alkyl, alkoxy or ester group of carbon atoms less than or equal to twelve; or one or more than one heteroatom selected from N, O, F, Si, P, S, Cl, Br or I.

7. The method of fabricating the structure according to claim 5, wherein a mass ratio of the component A and/or the component B to the monomer of the plurality of alignment molecules is in 5~50%.

8. The method of fabricating the structure according to claim 5, wherein a molecular weight of the alignment molecules is in $5 \times 10^3 \sim 5 \times 10^5$ g/mole.

9. The method of fabricating the structure according to claim 5, wherein the solvent comprises one or more than one composition of N-methylpyrrolidone, N-ethyl pyrrolidone, γ-butyrolactone, N,N-dimethylformamide, N,N-dimethylacetamide, dimethyl sulfoxide, m-cresol or chloroform.

10. The method of fabricating the structure according to claim 5, wherein the alignment molecule solution further comprises a leveling agent, a mass ratio of the leveling agent to the alignment molecule solution is in 0.012%, and the leveling agent is selected from isophorone, diacetone alcohol, aromatic hydrocarbon mixture or dibasic ester mixture.

11. A liquid crystal display, comprising:
two substrates, oppositely arranged and parallel to each other;
a liquid crystal medium, having a plurality of photo-polymerizable monomers and disposed between the two substrates; and
two alignment films, respectively formed on a surface of each substrate neighboring the liquid crystal medium, wherein each alignment film comprises the plurality of alignment molecules having the formula e

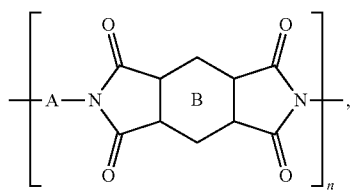

wherein the component A and the component B in formula e comprise terphenyl, the two alignment films are formed by polymerizing monomers of at least an anhydride, a first diamine having terphenyl and a second diamine not having terphenyl, the first diamine is selected from one of the diamines having terphenyl represented by formula t2

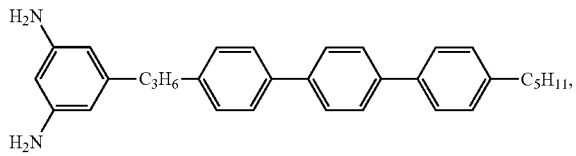

formula t5

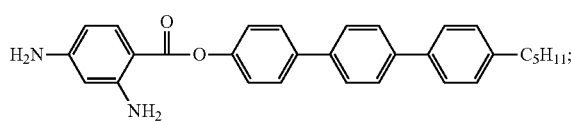

and a mass amount of the first diamine is less than a mass amount of the second diamine.

12. The liquid crystal display according to claim 11, wherein the component A and/or the component B further comprise(s) an alkyl, alkoxy or ester group of carbon atoms less than or equal to twelve; or one or more than one heteroatom selected from N, O, F, Si, P, S, Cl, Br or I.

13. The liquid crystal display according to claim 11, wherein a mass ratio of the component A or the component B to the monomer of the plurality of alignment molecules is in 5%~50%.

14. The liquid crystal display according to claim 11, wherein a molecular weight of the alignment molecular is in $5\times10^3 \sim 5\times10^5$ g/mole.

15. The liquid crystal display according to claim 11, wherein the plurality of photo-polymerizable monomers has one or more than one compound represented by following:

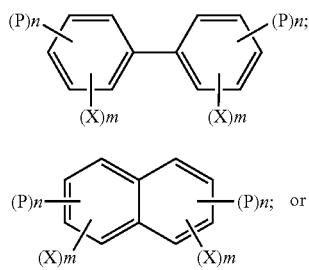

formula 1 formula 2

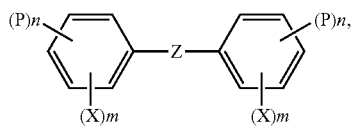

formula 3 wherein the functional group P represents a polymerizable group comprising one or more than one group selected from methacrylate, acrylate, vinyl, ethylene or epoxy; the integer n of 1, 2 or 3 represents a number of the functional group(s) P bonding to an aromatic ring; the substituent X comprises —F, —Cl, —Br, —CH$_3$, —CN or an alkyl, alkyl ether or alkyl thiol ether group consisted of 2-8 carbon atoms; the integer m of 1, 2 or 3 represents a number of the substituent(s) X bonding to the aromatic ring; and the functional group Z represents one or more than one group selected from —O—, —COO—, —OCO—, —CH$_2$O—, —OCH$_2$O—, —O(CH$_2$)$_2$O—, —COCH$_2$—, —CH$_2$— or —C≡C—.

16. The liquid crystal display according to claim 15, wherein a hydrogen atom (H) in the functional group Z is substituted by —F, —Cl, —Br, —CH$_3$ or —CN.

17. The liquid crystal display according to claim 11, further comprising two electrodes respectively disposed between each alignment film and each substrate.

18. The liquid crystal display according to claim 11, wherein a mass ratio of the plurality of photo-polymerizable monomers to the liquid crystal medium is in 0.25~5%.

* * * * *